United States Patent
Grigg et al.

(10) Patent No.: US 9,971,885 B2
(45) Date of Patent: *May 15, 2018

(54) DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS

(71) Applicant: BANK OF AMERICA CORPORATION, Charlotte, NC (US)

(72) Inventors: David M. Grigg, Rock Hill, SC (US); Peter John Bertanzetti, Charlotte, NC (US); Charles Jason Burrell, Middleburg, FL (US); Carrie Anne Hanson, Charlotte, NC (US); Joseph Neil Johansen, Rock Hill, SC (US); Michael E. Toth, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/016,130

(22) Filed: Feb. 4, 2016

(65) Prior Publication Data

US 2016/0156609 A1 Jun. 2, 2016

Related U.S. Application Data

(63) Continuation of application No. 14/175,646, filed on Feb. 7, 2014, now Pat. No. 9,390,242.

(51) Int. Cl.
*G06F 21/31* (2013.01)
*H04L 29/06* (2006.01)
*H04W 4/02* (2018.01)

(52) U.S. Cl.
CPC .............. *G06F 21/31* (2013.01); *H04L 63/08* (2013.01); *H04L 63/10* (2013.01); *H04W 4/02* (2013.01);
(Continued)

(58) Field of Classification Search
CPC .................................. G06F 21/31; H04L 63/08
See application file for complete search history.

(56) References Cited

U.S. PATENT DOCUMENTS

| | | |
|---|---|---|
| 6,256,670 B1 | 7/2001 | Davies |
| 6,422,462 B1 | 7/2002 | Cohen |

(Continued)

FOREIGN PATENT DOCUMENTS

EP   2645285   10/2013

OTHER PUBLICATIONS

U.S. Patent & Trademark Office. U.S. Final Office Action dated Aug. 27, 2015. U.S. Appl. No. 14/175,701. Name of Applicant: Bank of America Corporation. English Language. 21 pages.

(Continued)

*Primary Examiner* — Simon Kanaan
(74) *Attorney, Agent, or Firm* — Michael A. Springs; Moore & Van Allen PLLC; Peter B. Stewart

(57) ABSTRACT

Systems, apparatus, methods, and computer program products are provided for determining a user's authentication requirements/credentials for a specific network access session based on the current location of the user in comparison to predetermined boundaries of location that have altered authentication requirements, in the form of, increased or decreased authentication requirements/credentials that differ from the standard authentication requirements.

12 Claims, 6 Drawing Sheets

(52) U.S. Cl.
CPC ........... *H04W 4/021* (2013.01); *H04W 4/023* (2013.01); *G06F 2221/2111* (2013.01)

(56) References Cited

U.S. PATENT DOCUMENTS

| | | |
|---|---|---|
| 6,651,168 B1 | 11/2003 | Kao et al. |
| 6,748,367 B1 | 6/2004 | Lee |
| 7,058,806 B2 | 6/2006 | Smeets et al. |
| 7,111,323 B1 | 9/2006 | Bhatia et al. |
| 7,529,741 B2 | 5/2009 | Aravamudan et al. |
| 7,627,505 B2 | 12/2009 | Yoshida et al. |
| 7,693,771 B1 | 4/2010 | Zimmerman et al. |
| 7,698,443 B2 | 4/2010 | Yaffe et al. |
| 7,783,281 B1 | 8/2010 | Cook et al. |
| 8,012,219 B2 | 9/2011 | Mendez et al. |
| 8,295,898 B2 | 10/2012 | Ashfield et al. |
| 8,332,272 B2 | 12/2012 | Fisher |
| 8,352,323 B2 | 1/2013 | Fisher |
| 8,412,626 B2 | 4/2013 | Hirson et al. |
| 8,644,506 B2 | 2/2014 | Zellner |
| 8,660,358 B1 | 2/2014 | Bergboer et al. |
| 8,682,802 B1 | 3/2014 | Kannanari |
| 8,683,571 B2 | 3/2014 | Zapata et al. |
| 8,732,814 B2 | 5/2014 | Radhakrishnan et al. |
| 8,744,968 B1 | 6/2014 | Grigg et al. |
| 8,768,838 B1 | 7/2014 | Hoffman |
| 8,850,575 B1 | 9/2014 | Shaashua et al. |
| 8,869,305 B1 | 10/2014 | Huang |
| 8,881,306 B2 | 11/2014 | Feldman et al. |
| 8,930,271 B1 | 1/2015 | Ellis et al. |
| 8,973,102 B2 | 3/2015 | Jakobsson |
| 8,997,215 B2 | 3/2015 | Srinivas et al. |
| 9,185,101 B2 | 11/2015 | Grigg et al. |
| 9,185,117 B2 | 11/2015 | Grigg et al. |
| 9,208,301 B2 | 12/2015 | Grigg et al. |
| 9,213,814 B2 | 12/2015 | Grigg et al. |
| 9,223,951 B2 | 12/2015 | Grigg et al. |
| 9,286,450 B2 | 3/2016 | Grigg et al. |
| 9,305,149 B2 | 4/2016 | Grigg et al. |
| 9,317,673 B2 | 4/2016 | Grigg et al. |
| 9,317,674 B2 | 4/2016 | Grigg et al. |
| 9,331,994 B2 | 5/2016 | Grigg et al. |
| 9,390,242 B2 | 7/2016 | Grigg et al. |
| 9,391,976 B2 | 7/2016 | Grigg et al. |
| 9,391,977 B2 | 7/2016 | Grigg et al. |
| 9,391,990 B2 | 7/2016 | Grigg et al. |
| 9,398,000 B2 | 7/2016 | Grigg et al. |
| 9,477,960 B2 | 10/2016 | Grigg et al. |
| 9,483,766 B2 | 11/2016 | Grigg et al. |
| 9,509,685 B2 | 11/2016 | Grigg et al. |
| 9,509,702 B2 | 11/2016 | Grigg et al. |
| 9,525,685 B2 | 12/2016 | Grigg et al. |
| 9,530,124 B2 | 12/2016 | Grigg et al. |
| 9,565,195 B2 | 2/2017 | Grigg et al. |
| 9,584,527 B2 | 2/2017 | Grigg et al. |
| 9,595,025 B2 | 3/2017 | Grigg et al. |
| 9,628,495 B2 | 4/2017 | Grigg et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0045328 A1 | 3/2003 | Natsuno |
| 2003/0065805 A1 | 4/2003 | Barnes, Jr. |
| 2003/0163708 A1 | 8/2003 | Tang |
| 2005/0119978 A1 | 6/2005 | Ates |
| 2006/0036868 A1 | 2/2006 | Cicchitto |
| 2007/0055594 A1 | 3/2007 | Rivest et al. |
| 2007/0100773 A1 | 5/2007 | Wallach |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0250920 A1 | 10/2007 | Lindsay |
| 2008/0167965 A1 | 7/2008 | Von Nothaus et al. |
| 2008/0293397 A1 | 11/2008 | Gajdos et al. |
| 2008/0319889 A1 | 12/2008 | Hammad |
| 2009/0019534 A1 | 1/2009 | Bakshi et al. |
| 2009/0100529 A1 | 4/2009 | Livnat et al. |
| 2009/0117883 A1 | 5/2009 | Coffing et al. |
| 2009/0150286 A1 | 6/2009 | Barton |
| 2009/0187492 A1 | 7/2009 | Hammad et al. |
| 2009/0241178 A1 | 9/2009 | Burch et al. |
| 2010/0016001 A1 | 1/2010 | Yang |
| 2010/0048167 A1 | 2/2010 | Chow et al. |
| 2010/0064345 A1 | 3/2010 | Bentley et al. |
| 2010/0100897 A1 | 4/2010 | Smith |
| 2010/0122333 A1 | 5/2010 | Noe |
| 2010/0257099 A1 | 10/2010 | Bonalle et al. |
| 2011/0004921 A1* | 1/2011 | Homer ................. G06F 21/31 726/3 |
| 2011/0007921 A1* | 1/2011 | Stewart, Jr. .......... H04R 1/2865 381/340 |
| 2011/0016534 A1 | 1/2011 | Jakobsson |
| 2011/0099104 A1 | 4/2011 | Nybom |
| 2011/0137804 A1 | 6/2011 | Peterson |
| 2011/0166992 A1 | 7/2011 | Dessert et al. |
| 2011/0167440 A1 | 7/2011 | Greenfield |
| 2012/0030109 A1 | 2/2012 | Dooley et al. |
| 2012/0054057 A1 | 3/2012 | O'Connell et al. |
| 2012/0095916 A1 | 4/2012 | Dorsey et al. |
| 2012/0160912 A1 | 6/2012 | Laracey |
| 2012/0171237 A1 | 7/2012 | Ching et al. |
| 2012/0174237 A1 | 7/2012 | Krzyzanowski |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0254943 A1 | 10/2012 | Li |
| 2012/0260318 A1 | 10/2012 | Fromentoux et al. |
| 2013/0031003 A1 | 1/2013 | Dorsey et al. |
| 2013/0031004 A1 | 1/2013 | Dorsey et al. |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097683 A1 | 4/2013 | Davis et al. |
| 2013/0102283 A1 | 4/2013 | Lau et al. |
| 2013/0138627 A1 | 5/2013 | Zaydman et al. |
| 2013/0143621 A1 | 6/2013 | Kumaran |
| 2013/0160100 A1 | 6/2013 | Langley |
| 2013/0167207 A1 | 6/2013 | Davis et al. |
| 2013/0179954 A1 | 7/2013 | Bidare |
| 2013/0188485 A1 | 7/2013 | Midani et al. |
| 2013/0212007 A1 | 8/2013 | Mattsson et al. |
| 2013/0219454 A1 | 8/2013 | Hewinson |
| 2013/0267204 A1 | 10/2013 | Schultz et al. |
| 2013/0290361 A1 | 10/2013 | Anderson et al. |
| 2013/0346302 A1 | 12/2013 | Purves et al. |
| 2014/0058938 A1 | 2/2014 | McClung, III |
| 2014/0096215 A1* | 4/2014 | Hessler ............... H04L 63/0869 726/7 |
| 2014/0123244 A1 | 5/2014 | Resch et al. |
| 2014/0129357 A1 | 5/2014 | Goodwin |
| 2014/0130127 A1 | 5/2014 | Toole et al. |
| 2014/0143149 A1* | 5/2014 | Aissi ..................... G06F 21/31 705/44 |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poornachandran et al. |
| 2014/0208401 A1 | 7/2014 | Balakrishnan et al. |
| 2014/0214640 A1 | 7/2014 | Mallikarjunan et al. |
| 2014/0244503 A1 | 8/2014 | Sadlier |
| 2014/0245391 A1 | 8/2014 | Adenuga |
| 2014/0245411 A1 | 8/2014 | Meng et al. |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0359709 A1 | 12/2014 | Nassar et al. |
| 2015/0032621 A1 | 1/2015 | Kar et al. |
| 2015/0032627 A1 | 1/2015 | Dill et al. |
| 2015/0039601 A1 | 2/2015 | Harrang et al. |

(56) References Cited

U.S. PATENT DOCUMENTS

| | | |
|---|---|---|
| 2015/0100495 A1 | 4/2015 | Salama et al. |
| 2015/0100788 A1 | 4/2015 | Chastain et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0171049 A1 | 6/2015 | Wasserman et al. |
| 2015/0206131 A1 | 7/2015 | Phillips et al. |
| 2015/0213474 A1 | 7/2015 | Howe |
| 2015/0229625 A1 | 8/2015 | Grigg et al. |
| 2015/0254646 A1 | 9/2015 | Harkey et al. |
| 2015/0254665 A1 | 9/2015 | Bondesen et al. |
| 2015/0254698 A1 | 9/2015 | Bondesen et al. |
| 2016/0026779 A1 | 1/2016 | Grigg et al. |
| 2016/0055326 A1 | 2/2016 | Votaw et al. |
| 2016/0055487 A1 | 2/2016 | Votaw et al. |
| 2016/0057144 A1 | 2/2016 | Grigg et al. |
| 2016/0156608 A1 | 6/2016 | Grigg et al. |

OTHER PUBLICATIONS

U.S. Appl. No. 14/928,392, filed Oct. 30, 2015.
Hsin-Yi Chiang et al.; "Improving User Authentication on Mobile Devices: a Touchscreen Graphical Password"; Aug. 2013; MobileHCl '13:Proceedings of the 15$^{th}$ International Conference on Human-Computer Interaction with Mobile Devices and Services; Publisher: ACM; pp. 251-260.

* cited by examiner

DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS

CROSS-REFERENCE TO RELATED APPLICATIONS

This application is a continuation of U.S. patent application Ser. No. 14/175,646, filed Feb. 7, 2014; the contents of which are hereby incorporated by reference

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 6015US1.014033.2098 | 14/175,639 | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 6015US2.014033.2099 | 14/175,646 | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 |
| 6016US1.014033.2101 | 14/175,701 | USER AUTHENTICATION BASED ON HISTORICAL TRANSACTION DATA | Feb. 7, 2014 |
| 6017US1.014033.2102 | 14/175,947 | USER AUTHENTICATION BASED ON HISTORICAL USER BEHAVIOR | Feb. 7, 2014 |
| 6018US1.014033.2103 | 14/175,954 | USER AUTHENTICATION BY GEO-LOCATION AND PROXIMITY TO USER'S CLOSE NETWORK | Feb. 7, 2014 |
| 6019US1.014033.2106 | 14/175,863 | USER AUTHENTICATION BASED ON OTHER APPLICATIONS | Feb. 7, 2014 |
| 6020US1.014033.2107 | 14/175,615 | USER AUTHENTICATION BASED ON FOB/INDICIA SCAN | Feb. 7, 2014 |
| 6021US1.014033.2108 | 14/175,688 | USER AUTHENTICATION BASED ON SELF-SELECTED PREFERENCES | Feb. 7, 2014 |
| 6021US2.014033.2155 | 14/175,672 | SELF-SELECTED USER ACCESS BASED ON SPECIFIC AUTHENTICATION TYPES | Feb. 7, 2014 |
| 6022US1.014033.2109 | 14/175,136 | SHUTTING DOWN ACCESS TO ALL USER ACCOUNTS | Feb. 7, 2014 |
| 6023US1.014033.2110 | 14/175,146 | PROVIDING AUTHENTICATION USING PREVIOUSLY-VALIDATED AUTHENTICATION CREDENTIALS | Feb. 7, 2014 |
| 6024US1.014033.2111 | 14/175,652 | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 6025US1.014033.2126 | 14/175,956 | SORTING MOBILE BANKING FUNCTIONS INTO AUTHENTICATION BUCKETS | Feb. 7, 2014 |
| 6025US2.014033.2127 | 14/175,962 | AUTHENTICATION LEVEL OF FUNCTION BUCKET BASED ON CIRCUMSTANCES | Feb. 7, 2014 |

| Docket Number | U.S. Patent Application Ser. No. | Title | Filed On |
| --- | --- | --- | --- |
| 6034US1.014033.2115 | 14/175,771 | REMOTE REVOCATION OF APPLICATION ACCESS BASED ON LOST OR MISAPPROPRIATED CARD | Feb. 7, 2014 |
| 6034US2.014033.2116 | 14/175,786 | REVOCATION OF APPLICATION ACCESS BASED ON NON-CO-LOCATED | Feb. 7, 2014 |
| 6015US3C2.014033.2667 | To Be Assigned | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Concurrently herewith |

FIELD

In general, embodiments of the invention relate to user authentication and, more particularly, determining user authentication requirements/credentials for a specific mobile network access session based on the current location of the user being within a predefined area requiring altered (i.e., increased or decreased) authentication requirements.

BACKGROUND

User authentication is typically required when a user conducts a transaction using a debit/credit card or seeks access to network-based services that store or have access to information that is personnel and/or warrants protection from unauthorized access by others (e.g., an online or mobile banking service or the like). User authentication serves to validate that the individual conducting the transaction is the individual authorized to use the debit/credit card account or that the individual seeking access to the network-based service is the individual authorized to access the service. Typically, a user provides authentication credentials, otherwise referred to herein as authentication requirements, (e.g., a user ID and password), which are then compared to the user's securely stored authentication credentials and, if the authentication credentials provided by the user match the stored authentication credentials, the user is allowed to conduct the transaction or gain access to the network-based service.

In many instances, a burden is placed on the user providing the authentication requirements. Specifically, the user must remember their authentication credential or, in the event that the user forgets the authentication credentials undertake a procedure to recover the authentication credentials. Remembering the authentication credentials can become problematic if the user does not use the network service and/or conduct such transactions frequently or if the user is required to change their authentication credentials periodically in order to insure their security. In addition to problems associated with remembering authentication credentials, the mere process of entering such authentication credentials either at a point-of-sale (POS) location or at a gateway to network service entry can be a burdensome and risky endeavor. In some instances, entry of such authentication credentials can be an inefficient and time-consuming process. For example, if the user is implementing a handheld mobile device, such as smart cellular telephone or the like, to gain access to a network-based service, entry of the authentication credentials on the device requires the ability of the user to see the display and accurately enter the credentials via the downsized keypad. If the authentication credentials require different case lettering and/or non-alpha-numeric characters for security purposes entry becomes even more daunting and prone to entry errors. Moreover, if the user repeatedly enters the authentication incorrectly, the network-service may see this as a security risk and bar the user from further attempts, thereby denying the user entry to the network-service.

In addition to user inefficiency problems, entering authentication credentials in a public setting, such as a POS location or via a mobile device, presents risks that the authentication credentials may be nefariously intercepted by someone in the vicinity.

In today's computing networking environments, especially in the mobile or wireless realm, the entity that provides the network service or the authenticating entity may have instantaneous availability to other information, besides the user-provided authentication credentials, which can serve to at least assist in validating the identity of the user. Therefore, a need exists to develop other methods, apparatus and computer program products for user authentication. The desired methods, apparatus and computer program products for user authentication should alleviate problems associated with inefficiencies in the current user authentication process and/or add additional security to the user authentication process. Further, the desired methods, apparatus and computer program products should leverage other information that the authenticating entity knows about the user at the time of the authentication request to assist in the authentication process. In this regard, the other information known about the user may serve to adjust the authentication requirements/credentials that the user must provide to gain access or, in some instances, eliminate the need for the user to provide authentication requirements/credentials.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by determining a user's authentication requirements/credentials for a specific network access session based on the current location of the user in comparison to predetermined boundaries of location that have altered authentication requirements (i.e., increased or decreased authentication requirements/credentials that differ from the standard authentication requirements). The entity providing the network service, e.g., a financial institution providing a banking application or the like, may configure an area for increased authentication requirements based on the area having a higher than average misappropriation occurrence rate or the area having unsecured wireless network access or the like. In other embodiments, the user may configure areas for altered authentication requirements, for example, the user may designate a frequently visited location as requiring decreased authentication requirements or the like. The predetermined area may also coincide with a predetermined time (e.g., time of year, month, day or the like) in which the altered authentication requirements apply. Moreover, the altered authentication requirements may be temporal, for example, the altered authentication requirements apply to a specific event occurring at a specified time at the designated location.

As such, when the authentication requirements are decreased the present invention serves to expedite the process for authenticating a user who desires to gain access to a network service, such as a banking application or the like. In those embodiments in which the authentication requirements are increased, the present invention serves to add heightened security in those instances in which the user is located in a location that is deemed to require such.

An apparatus for determining user authentication requirements for accessing a service define first embodiments of the invention. The apparatus includes a computing platform having a memory and a processor in communication with the memory. The apparatus further includes an authentication requirements module that is stored in the memory and executable by the processor. The module is configured to receive a request for a user to access a service requiring authentication and, in response to receiving the request, determine a current physical location of the user. The module is further configured to determine that the current location of the user is proximate to or within a predefined physical area having altered authentication requirements. The altered authentication requirements provide for one of (1) increased or (2) decreased authentication requirements in comparison to standard authentication requirements used to access the service. In addition, the module is configured to identify the altered authentication requirements associated with the predefined physical area. In response to identifying the authentication requirements, the user is requested to provide the identified authentication requirements and is provided access to the service in response to the user providing the determined authentication requirements/credentials.

In specific embodiments of the apparatus, the predefined physical area is defined by an entity providing the network service, while in other embodiments the predefined physical area is defined by the user.

In other specific embodiments of the apparatus, the authentication requirements module is further configured to determine that that the current location of the user is within the predefined physical area during a predetermined period of time having altered authentication requirements.

In further specific embodiments the apparatus includes a service access module that is stored in the memory and executable by the processor. The service access module is configured to determine that the current location of the user is within the predefined physical area having an altered level of access within the service. The altered level of access provides for one of (1) increased or (2) decreased access to functionality within the service once the user has met the altered authentication requirements.

Moreover, in specific embodiments of the apparatus, the authentication requirements module is further configured to determine a level of authentication required based on proximity of the current user to the predefined physical area.

In additional embodiments of the apparatus, the predefined physical area is associated with a physical area experiencing above normal incidents of misappropriation and the altered authentication requirements are increased authentication requirements, while in other embodiments of the apparatus the predefined physical area is associated with a physical area in which unsecure wireless communication is prevalent and the altered authentication requirements are increased authentication requirements.

A method for determining user authentication requirements defines second embodiments of the invention. The method includes receiving a request for a user to access a service requiring authentication and, in response to receiving the request, determining a current physical location of the user. The method further includes determining that the current location of the user is proximate to or within a predefined physical area having altered authentication requirements. Altered authentication requirements provide for one of (1) increased or (2) decreased authentication requirements in comparison to standard authentication requirements used to access the service. In addition, the method includes identifying the altered authentication requirements associated with the predefined physical area. In response the identifying the altered authentication requirements, the user is requested to provide the identified authentication requirements and is provided access to the service in response to the user providing the determined authentication requirements/credentials.

In specific embodiments of the method, the predefined physical area is defined by the entity providing the services and, in other embodiments of the method, the predefined physical area is defined by the user. As such the entity providing the network services and/or the user may designate certain areas having higher risk as areas requiring increased authentication requirements/credentials. Conversely, the entity providing the network services and/or the user may designate certain areas having lower risk as areas requiring decreased authentication requirements/credentials.

In further specific embodiments of the invention, the predefined physical area may be temporal, such that determining that the current location of the user is within the predefined physical area having altered authentication requirements further includes determining that the current location of the user is within the predefined physical area during a predetermined period of time in which the altered authentication requirements are invoked.

In additional specific embodiments the method includes determining that the current location of the user is within the predefined physical area having an altered level of access within the service, wherein the altered level of access provides for one of (1) increased or (2) decreased access to functionality within the service once the user has met the altered authentication requirements. The level of access defines functionality available to the user within the service based on the determined authentication requirements and the determination of the level of access may be independent of the determined altered authentication requirements.

In still further specific embodiments of the method, determining that the current location of the user is proximate to the predefined physical area having altered authentication requirements further includes determining a level of authentication required based on proximity of the current user to the predefined physical area. In still further embodiments, the level of authentication may associated with a determination of where the user currently lies on an authentication continuum that takes account other factors/attributes that affect the user's current state, in addition to the user's current location.

Moreover, in addition embodiments of the method, the predefined physical area is associated with a physical area experiencing above normal incidents of misappropriation or in area in which unsecure wireless communication is prevalent and the altered authentication requirements are increased authentication requirements.

A computer program product including a non-transitory computer-readable medium defines third embodiments of the invention. The computer-readable medium includes a first set of codes for causing a computer to receive a request for a user to access a service requiring authentication, Additionally, the computer-readable medium includes a second set of codes for causing a computer to, in response to receiving the request, determine a current physical location of the user. In addition the computer-readable medium includes a third set of codes for causing a computer to determine that the current location of the user is proximate to or within a predefined physical area having altered authentication requirements. The altered authentication requirements provide for one of (1) increased or (2) decreased authentication requirements in comparison to standard authentication requirements used to access the service. Additionally, the computer-readable medium includes a fourth set of codes for causing a computer to identify the altered authentication requirements associated with the predefined physical area.

Thus, systems, apparatus, methods, and computer program products herein described in detail below provide for determining a user's authentication requirements/credentials for a specific network access session based on the current location of the user in comparison to predetermined boundaries of location that have altered authentication requirements (i.e., increased or decreased authentication requirements/credentials that differ from the standard authentication requirements). Both the entity providing the network service or the user may designate areas for altered authentication requirements/credentials. The predetermined area may also coincide with a predetermined time (e.g., time of year, month, day or the like) in which the altered authentication requirements apply. Moreover, the altered authentication requirements may be temporal, for example, the altered authentication requirements apply to a specific event occurring at a specified time at the designated location.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
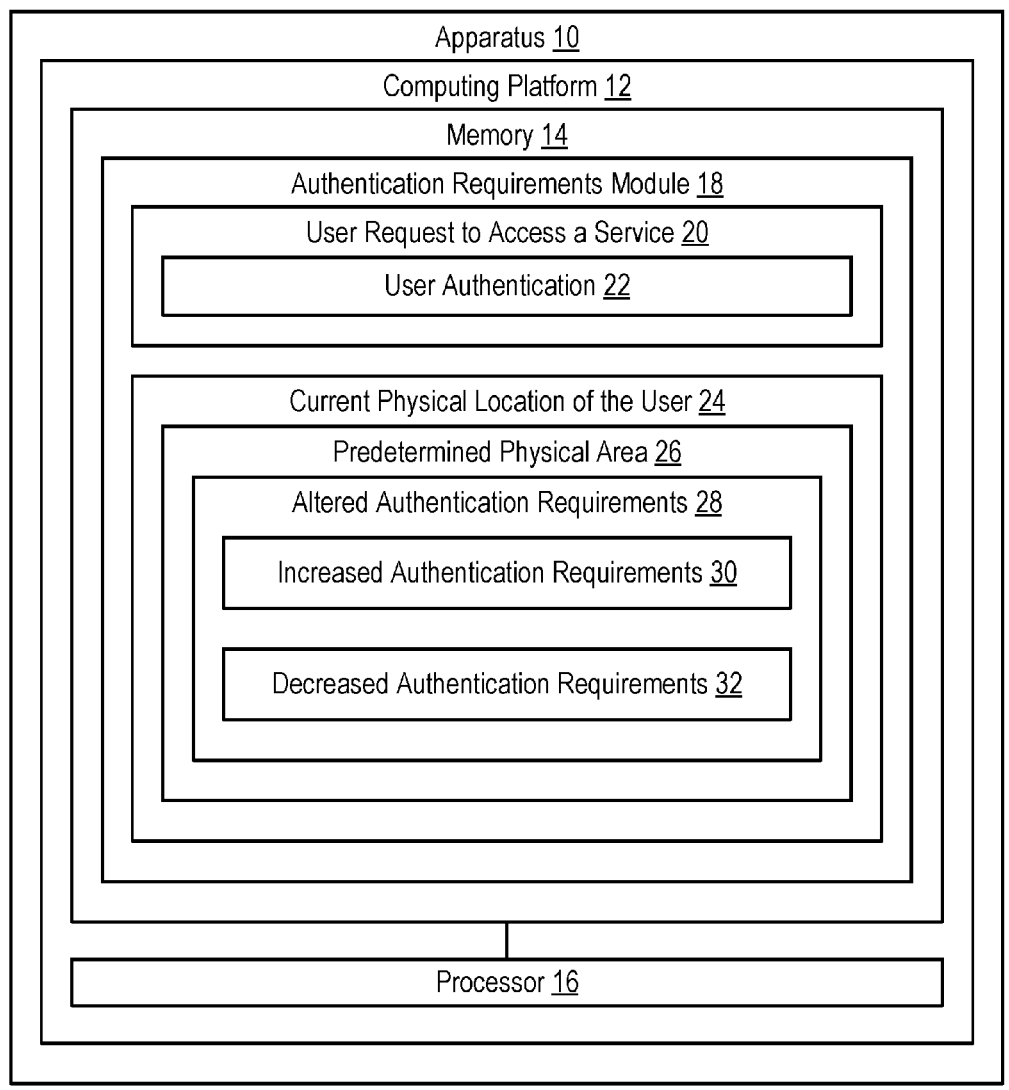
Figure 2:
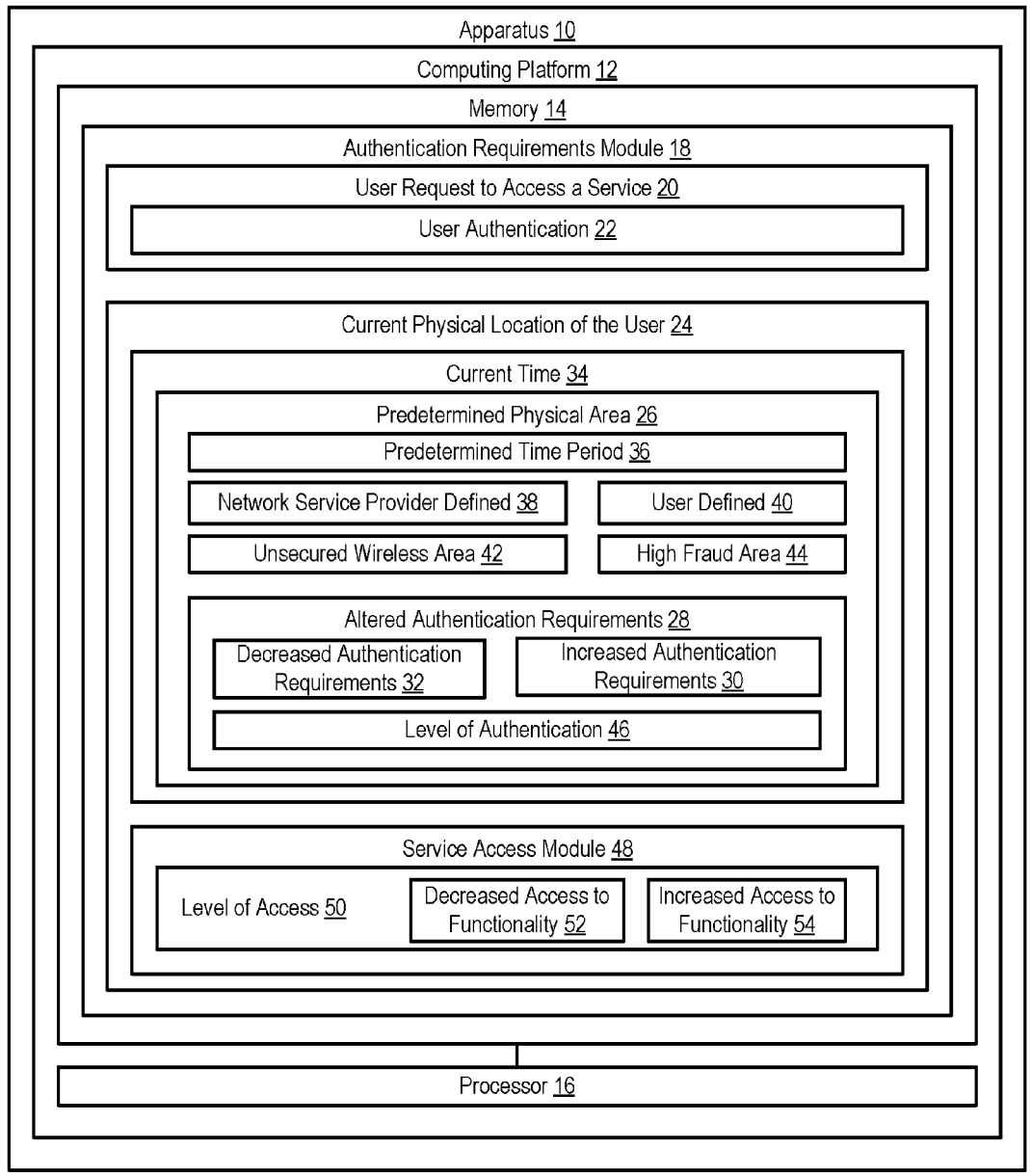
Figure 3:
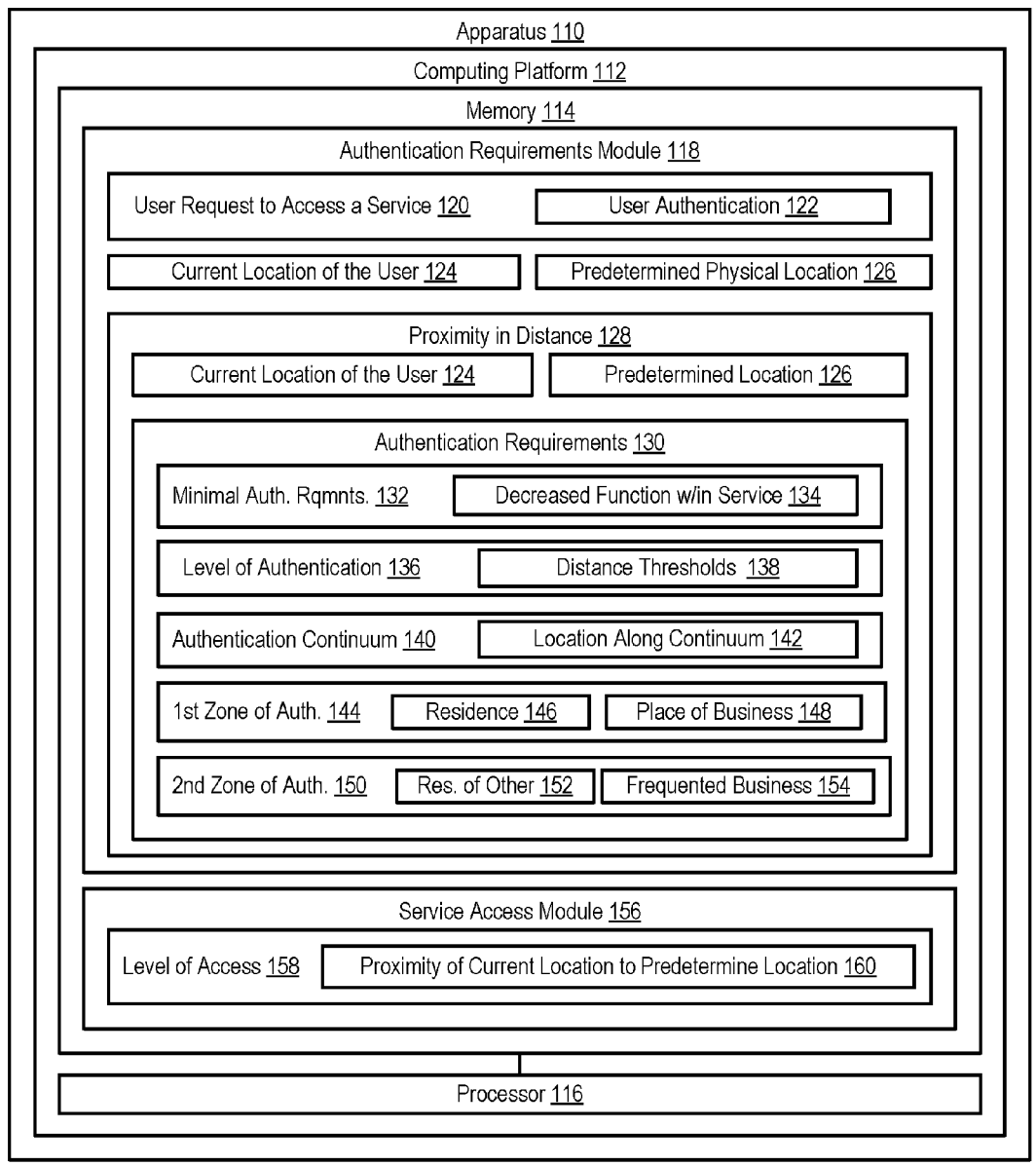
Figure 4:
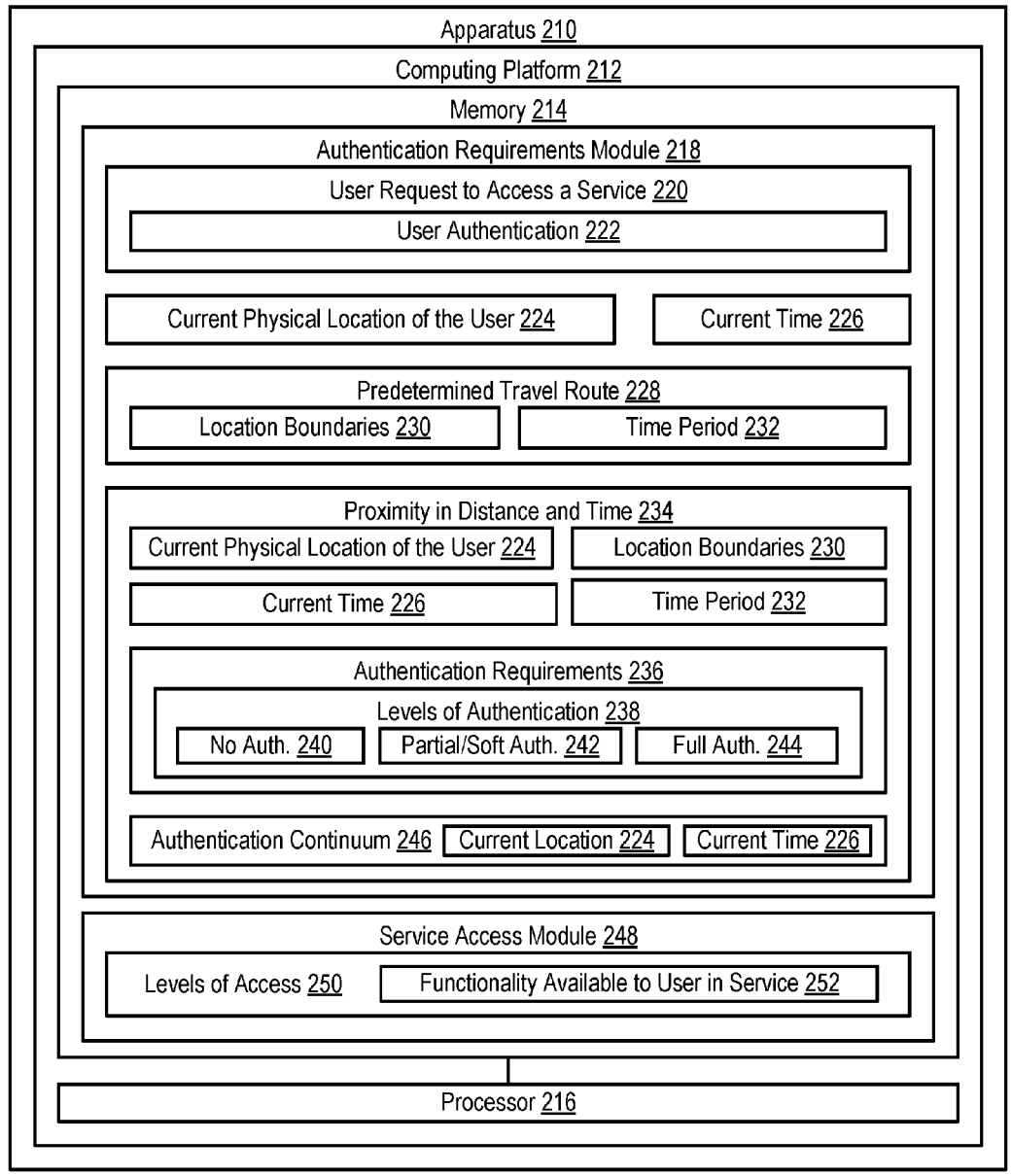
Figure 5:
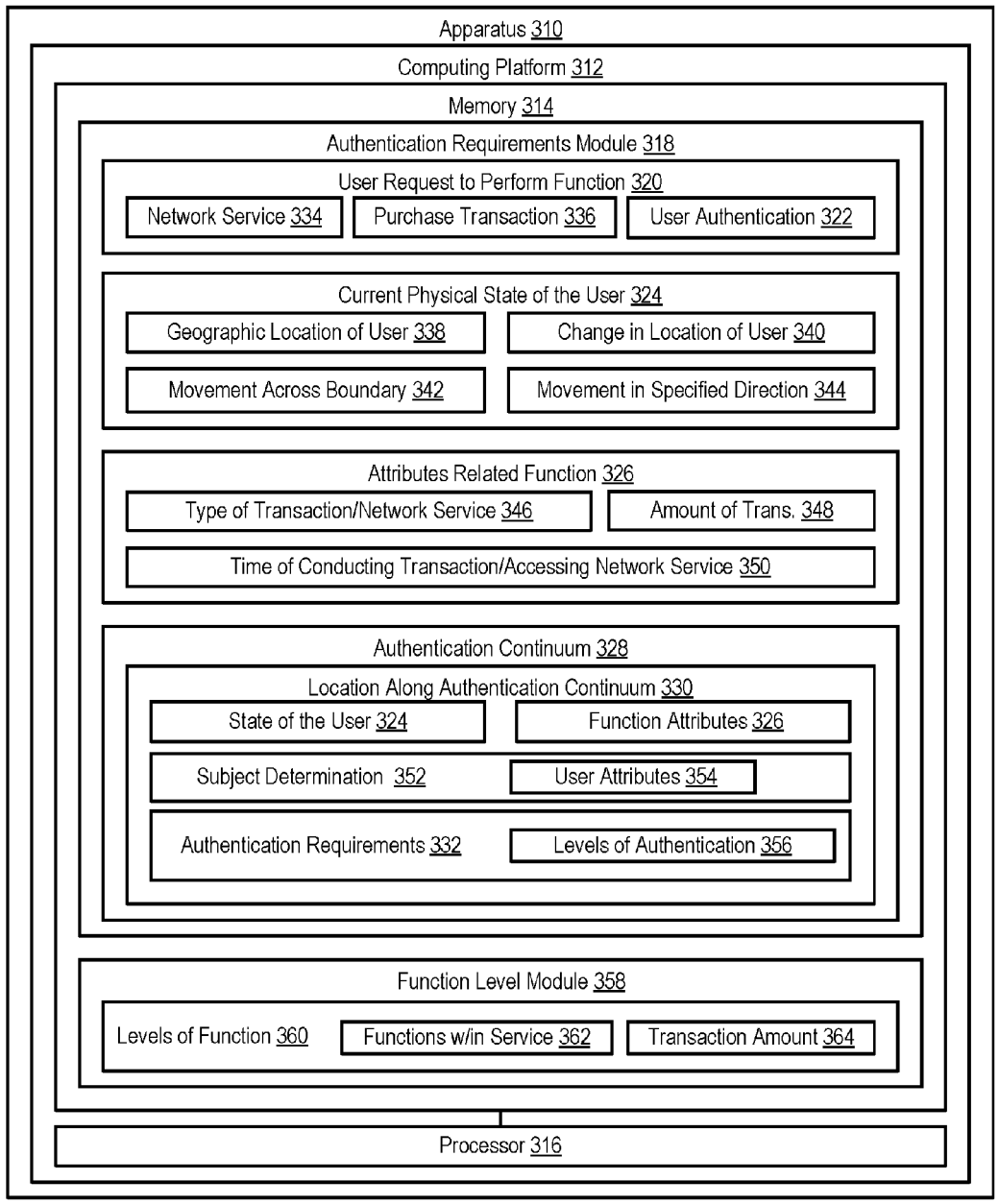
Figure 6:
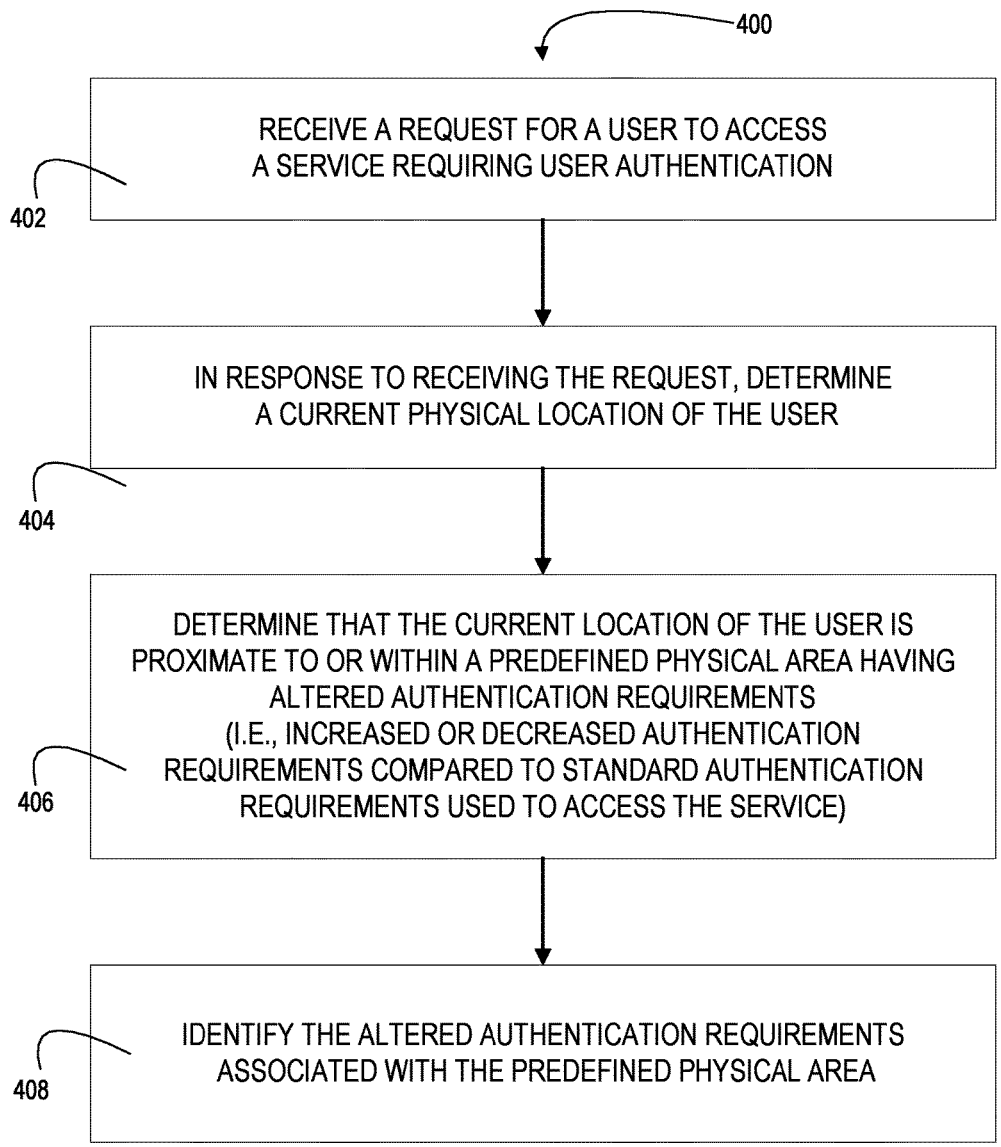

Having thus described embodiments of the invention in general terms, reference will now be made to the accompanying drawings, which are not necessarily drawn to scale, and wherein:

FIG. 1 provides a block diagram of an apparatus configured for determining user authentication requirements/credentials for a specific mobile network access session based on the current location of the user being within a predefined area requiring altered (i.e., increased or decreased) authentication requirements, in accordance with embodiments of the present invention;

FIG. 2 provides a more detailed block diagram of an apparatus configured for determining user authentication requirements/credentials for a specific mobile network access session based on the current location of the user being within a predefined area requiring altered (i.e., increased or decreased) authentication requirements, in accordance with present embodiments of the invention;

FIG. 3 provides a detailed block diagram of an alternate embodiment of an apparatus configured for determining a user's authentication requirements/credentials for a specific network access session based on the current location of the user in comparison to a user's normal boundary of location, in accordance with alternate embodiments of the present invention;

FIG. 4 provides a detailed block diagram of an alternate embodiment of an apparatus configured for determining a user's authentication requirements/credentials for a specific mobile network access session based on the current location of the user in comparison to a known typical travel route of the user, in accordance with alternate embodiments of the present invention;

FIG. 5 provides a detailed block diagram of an alternate embodiment of an apparatus configured for determining a user's authentication requirements/credentials for a specific service along an authentication continuum based on a current state of the user and/or service attributes, in accordance with alternate embodiments of the present invention; and FIG. 6 provides a flow diagram of a method for determining user authentication requirements/credentials for a specific mobile network access session based on the current location of the user being within a predefined area requiring altered (i.e., increased or decreased) authentication requirements, in accordance with present embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Small-talk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

In those embodiments in which the apparatus comprises or is in communication with a mobile communication device, the user of the mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the user of the mobile device.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for determining a user's authentication requirements/credentials for a specific network access session based on the current location of the user in comparison to predetermined boundaries of location that have altered authentication requirements (i.e., increased or decreased authentication requirements/credentials that differ from the standard authentication requirements). The entity providing the network service, e.g., a financial institution providing a banking application or the like, may configure an area for increased authentication requirements based on the area having a higher than average misappropriation occurrence rate or the area having unsecured wireless network access or the like. In other embodiments, the user may configure areas for altered authentication requirements, for example, the user may designate a frequently visited location as requiring decreased authentication requirements or the like. The predetermined area may also coincide with a predetermined time (e.g., time of year, month, day or the like) in which the altered authentication requirements apply. Moreover, the altered authentication requirements may be temporal, for example, the altered authentication requirements apply to a specific event occurring at a specified time at the designated location.

As such, when the authentication requirements are decreased the present invention serves to expedite the process for authenticating a user who desires to gain access to a network service, such as a banking application or the like. In those embodiments in which the authentication requirements are increased, the present invention serves to add heightened security in those instances in which the user is located in a location that is deemed to require such.

Referring to FIG. 1, a block diagram is presented of an apparatus 10 configured determining user authentication requirements/credentials for a specific mobile network access session based on the current location of the user being within a predefined area requiring altered (i.e., increased or decreased) authentication requirements, in accordance with embodiments of the present invention. The apparatus 10 includes a computing platform 12 having a memory 14 and at least one processor 16 in communication with the memory 14. The memory 14 of apparatus 10 stores authentication requirements module 18. The authentication requirements module 18 is configured to determining user authentication requirements/credentials for a specific mobile network access session based on the current location of the user being within a predefined area requiring altered (i.e., increased or decreased) authentication requirements. A specific example of a network service may include, but is not limited to, a mobile banking network service or the like. As such, the authentication requirements module 18 is configured to receive a request 20 from a mobile communication device for a user to access a network-based service that requires user authentication 22. The user authentication may be required to gain access to the network-service and/or to conduct a transaction on the network-service.

In response to receiving the request, the module 18 is configured to determine the current physical (i.e., geographic) location 24 of the user. The user is known to the module 18 since the service request is coming from a mobile communication device that is identifiable by procedures discussed previously. The current physical location 24 of the user may be determined by a location-determining mechanism (e.g., Global Positioning System (GPS) device or the like) in the mobile communication device or via wireless signals transmitted from the mobile device using triangulation methodology or the like. In addition, in those embodiments in which the mobile communication device is linked to vehicle equipped with location determining mechanisms, the vehicle and/or a combination of the vehicle and the mobile communication may determine the current physical location 24.

Once the authentication requirements module 18 has the current physical location of the user 24, the module 18 is further configured to determine that the current physical location 24 is proximity to or within a predetermined physical area 26 having altered authentication requirements 28. In specific embodiments, certain geographic areas will be predetermined as requiring increased authentication requirements 30 or decreased authentication requirements 32 in comparison to standard authentication requirements used to access the service (i.e., the authentication requirements/credentials typically requested of a user absent any further knowledge about the state of the user). Increased authentication requirements 30 may be required if the predetermined physical area has been identified as an area of high risk (e.g., high misappropriation rate area, unsecure wireless communication area or the like). In such embodiments, the increased authentication requirements 30 may include a request for the user to provide further personnel data or answer out-of-wallet challenge questions. In specific embodiments, in which the predetermined physical area has been identified as an area of highest risk, the altered authentication requirements may include barring the user from accessing the service (i.e., no authentication possible). Decreased authentication requirements 32 may be required if the predetermined area has been identified as an area of low risk (e.g., an area where the user customarily resides). In such embodiments, the decreased authentication requirements 32 may be that no authentication is required by the user to access the service or partial authentication (i.e., soft authentication) is required. Partial authentication is defined as some form of authentication credentials less than full/standard authentication credentials. For example, if full credentials (i.e., standard credentials normally required to access the service) comprise a username, and passcode/password partial/soft authentication credentials may be limited a less complex passcode, e.g., a four digit Personal Identification Number (PIN) or the like.

Once the determination is made that the current physical location of the user 24 is proximate to or within a predetermined physical area having altered authentication requirements 28, the altered authentication requirements are identified and a request is provided to the user, typically via display on the mobile communication device, to input the altered authentication requirements. Once the user has inputted the altered authentication requirements, the user is provided access to the service.

Referring to FIG. 2, a block diagram is presented of an apparatus 10 configured to determining user authentication requirements/credentials for a specific mobile network access session based on the current location of the user being within a predefined area requiring altered (i.e., increased or decreased) authentication requirements, in accordance with embodiments of the present invention. The apparatus 10 may include any type and/or combination of one or more computing devices. The apparatus 10 is operable to receive and execute modules, routines and applications, such as authentication requirements module 18 and the like.

The apparatus 10 includes computing platform 12 that can receive and execute routines and applications. Computing platform 12 includes memory 14, which may comprise volatile and nonvolatile memory such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk.

Further, computing platform 12 also includes at least one processor 16, which may be an application-specific integrated circuit ("ASIC"), or other chipset, processor, logic circuit, or other data processing device. Processor 16 or other processor such as ASIC may execute an application programming interface ("API") layer (not shown in FIG. 2)

that interfaces with any resident programs, such as authentication requirements module 18 or the like, stored in the memory 14 of apparatus 10. Processor 16 includes various processing subsystems (not shown in FIG. 2) embodied in hardware, firmware, software, and combinations thereof, that enable the functionality of apparatus 10 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

As previously noted in relation to FIG. 1, memory 14 stores authentication requirements module 18 that is configured to determine user authentication requirements/credentials for a specific mobile network access session based on the current location of the user being within a predefined area requiring altered (i.e., increased or decreased) authentication requirements. The authentication requirements module 18 is configured to receive a request 20 from a mobile communication device for a user to access a network-based service that requires user authentication 22. The user authentication may be required to gain access to the network-service and/or to conduct a transaction on the network-service.

In response to receiving the request, the module 18 is configured to determine the current physical (i.e., geographic) location 24 of the user. The user is known to the module 18 since the service request is coming from a mobile communication device that is identifiable by procedures discussed previously. The current physical location 24 of the user may be determined by a location-determining mechanism (e.g., Global Positioning System (GPS) device or the like) in the mobile communication device or via wireless signals transmitted from the mobile device using triangulation methodology or the like. In specific embodiments, the determination of the altered authentication requirements may be temporal (i.e., the altered authentication requirements in the predetermined physical area 26 exist only for a predetermined time period). In such embodiments, the module 18 is further configured to determine a current time 34.

Once the authentication requirements module 18 has the current physical location of the user 24, the module 18 is further configured to determine that the current physical location 24 is proximity to or within a predetermined physical area 26 having altered authentication requirements 28. In specific embodiments, certain geographic areas will be predetermined as requiring increased authentication requirements 30 or decreased authentication requirements 32 in comparison to standard authentication requirements used to access the service (i.e., the authentication requirements/credentials typically requested of a user absent any further knowledge about the state of the user). In such embodiments, the increased authentication requirements 30 may include a request for the user to provide further personnel data or answer out-of-wallet challenge questions. The decreased authentication requirements 32 may be that no authentication is required by the user to access the service or partial authentication (i.e., soft authentication) is required. Partial authentication is defined as some form of authentication credentials less than full/standard authentication credentials.

In specific embodiments of the invention, the predetermined physical area 26 may be defined by the service provider 38. For example, if the service provider is a financial institution providing an online or mobile banking service the financial institution may identify certain areas as high risk and require increased authentication requirements 30 in such areas. Examples of such high risk areas include, but are not limited to, areas having historically high rates of misappropriation 44, areas having unsecured wireless communication 42 and the like. In addition, the service provider may designate as area as requiring altered authentication requirements on a permanent basis or a temporary basis. For example, a service provider may designate a physical area where a heavily attended event is to be held as an area requiring increased authentication requirements for the time period over which the event will be held.

In other specific embodiments of the invention, the predetermined physical area 26 may be defined by the user 40. Such designation by the user may be permanent or temporary. For example, if the user is aware of upcoming travel plans, the user may designate travel routes or specific locations at the travel destination (i.e., hotels, residences, business offices) as areas requiring decreased authentication requirements 32. Further, if the upcoming travel plans are a one-time only occurrence the user may designate the locations as requiring decreased authentication requirements on a temporary basis (i.e., for a time period that expires at the conclusion of the travel period). However, if the travel occurs on a regular and/or ongoing basis (e.g., permanent vacation residence, same business travel destination or the like), the user may designate the locations as requiring decreased authentication requirements on a permanent basis or for designated continual time periods (e.g., certain times of week, month, year, or the like.)

In those embodiments of the invention in which the predetermined physical area 26 has altered authentication requirements 28 during a specified predetermined time period 36 (e.g., on a temporary basis or for designated time periods only), the module 18 is further configured to determine that the current time 34 is within the designate predetermined time period 36, such that the altered authentication requirements 28 designated for the predetermined time period 36 are invoked.

In further embodiments, the authentication module 18 may be configured to determine a level of authentication 46 from amongst a plurality of levels. Each level may be defined by predetermined based on distance threshold from the predetermined physical area 26. The predetermined distance thresholds may vary depending on the type or specificity of the predetermined physical area 26. In specific embodiments of the invention, the levels of authentication 38 may define three levels of authentication, (1) no authentication level; (2) partial/soft authentication level and (3) heightened authentication.

The no authentication level may be based on the user currently being physically located 24 within the boundaries of predetermined physical area 26. The no authentication level is configured such that the user is not required to provide authentication credentials to access the service. The partial authentication level may be based on (1) the user currently being physically located 24 within the boundaries of the predetermined physical location 26, or (2) the user currently being physically located 24 outside of the predetermined location by a predetermined distance. The partial authentication level is configured such that the user is required to provide to some, but less than full, authentication requirements/credentials to access the service. For example, if full authentication credentials (i.e., standard credentials normally required to access the service) comprise a username, and password, partial credentials may be limited to a less complex passcode, e.g., a four digit Personal Identification Number (PIN) or the like. The heightened authentication level may be based on the user currently being physically located 24 within the physical area 26 and may require the user to input additional personal information or answers to out-of-wallet challenge questions.

In further embodiments the apparatus includes a service access module 48 that is stored in the memory 14 and is executable by the processor 16. The service access module 48 is configured to determine a level of access 50 available to the user upon the user meeting the determined authentication requirements. The level of access 50 defines functionality available to the user within the service and may comprise decreased access to functionality 52 (compared to normal functionality) or increased access to functionality 54 (compared to normal functionality). In such embodiments the determination of the level of access 50 granted to the user may be independent of the determination of authentication requirements. The level of access may define transactions (or transaction limits) that the user is authorized to conduct or information the user is authorized to access during the session.

Referring to FIG. 3, a block diagram is presented of an apparatus 110 configured to determining a user's authentication requirements/credentials for a specific network access session based on the current location of the user in comparison to a user's normal boundary of location, in accordance with embodiments of the present invention. The apparatus 110 may include any type and/or combination of one or more computing devices. The apparatus 110 is operable to receive and execute modules, routines and applications, such as authentication requirements module 18 and the like.

The apparatus 110 includes computing platform 112 that can receive and execute routines and applications. Computing platform 112 includes memory 114, which may comprise volatile and nonvolatile memory such as read-only and/or random-access memory (RAM and ROM), EPROM, EEPROM, flash cards, or any memory common to computer platforms. Further, memory 114 may include one or more flash memory cells, or may be any secondary or tertiary storage device, such as magnetic media, optical media, tape, or soft or hard disk.

Further, computing platform 112 also includes at least one processor 116, which may be an application-specific integrated circuit ("ASIC"), or other chipset, processor, logic circuit, or other data processing device. Processor 116 or other processor such as ASIC may execute an application programming interface ("API") layer (not shown in FIG. 3) that interfaces with any resident programs, such as authentication requirements module 18 or the like, stored in the memory 114 of apparatus 110. Processor 116 includes various processing subsystems (not shown in FIG. 3) embodied in hardware, firmware, software, and combinations thereof, that enable the functionality of apparatus 110 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

The memory 114 stores authentication requirements module 118 that is configured to determining a user's authentication requirements/credentials for a specific network access session based on the current location of the user in comparison to a user's normal boundary of location. The authentication requirements module 118 is configured to receive a request 120 from a mobile communication device for a user to access a network-based service that requires user authentication 122. The user authentication may be required to gain access to the network-service and/or to conduct a transaction on the network-service.

In response to receiving the request, the module 118 is configured to determine the current physical (i.e., geographic) location 124 of the user. The user is known to the module 18 since the service request is coming from a mobile communication device that is identifiable by procedures discussed previously. The current physical location 124 of the user may be determined by a location-determining mechanism (e.g., Global Positioning System (GPS) device or the like) in the mobile communication device or via wireless signals transmitted from the mobile device using triangulation methodology or the like.

Once the authentication requirements module 118 has the current physical location of the user 124, the module 118 is further configured to determine the proximity in distance 128 of the current physical location of the user 124 to a predetermined physical location 126. The module 118 may access a user profile to determine that the user is associated with one or more predetermined physical locations 126. The predetermined physical locations 126 are geographic areas in which the user is frequently located, for example the user's place of residence, the user's place of business or the like. Predetermined physical locations 126 may be predetermined based on user inputs that identify the location. In such embodiments a user who is travelling may designate specific physical location (e.g., a temporary residence or place of business) for a specific period of time (i.e., the travel period) and, as such, the predetermined physical locations may be temporal, in nature. In other embodiments of the invention, the predetermined physical locations may be determined intuitively in an automated fashion based on monitoring, over time, the location of the user in relation to their mobile device. In such embodiments, the user may notified (via an alert or the like) of such locations for the purpose of confirming the location as one in which less authentication requirements may be required to access a service.

The authentication requirements module 118 is further configured to determine the authentication requirements 130 (i.e., the authentication credentials required by the user) for the user to currently access the service based on the proximity in distance 128 of the current physical location of the user 124 to the predetermined physical location 126.

In specific embodiments of the invention, the authentication requirements module 18 to determine the minimal authentication requirements 132 for the user to access the service based on proximity in distance 128 of the current physical location of the user 124 to the predetermined physical location 126. In such embodiments of the invention, the minimal authentication requirements may be no authentication required or partial authentication required based on the user being located within the boundaries of the predetermined physical location 126. In such embodiment of the invention, in which the user gains access to the service by providing the minimal authentication requirements/credentials, the user may be provided access to decreased functionality 134 within the service (i.e., less than full functionality). Decreased functionality may limit the user in terms of the transactions they may conduct within the service, the transaction amounts and/or the information that is accessible to the user during the network session. In such embodiments of the invention, if the user desires full functionality within the service, the user may provide full authentication/requirements credentials.

In further embodiments, the authentication module 118 may be configured to determine a level of authentication 136 from amongst a plurality of levels. Each level may be defined by predetermined distance thresholds 138 from the predetermined physical location 126. The predetermined distance thresholds 138 may vary depending on the type or specificity of the predetermined physical location 126. In specific embodiments of the invention, the levels of authentication 38 may define three levels of authentication, (1) no authentication level; (2) partial/soft authentication level and (3) full authentication.

The no authentication level may be based on the user currently being physically located 124 within the boundaries of predetermined physical location 126. The no authentication level is configured such that the user is not required to provide authentication credentials to access the service. The partial authentication level may be based on (1) the user currently being physically located 124 within the boundaries of the predetermined physical location 126, or (2) the user currently being physically located 124 outside of the predetermined location by a predetermined distance (i.e., first distance threshold). The predetermined distance is typically configured such that it represents a slight deviation from the boundaries of the predetermined physical location 126. The partial authentication level is configured such that the user is required to provide to some but less than full authentication requirements/credentials to access the service. For example, if full authentication credentials (i.e., standard credentials normally required to access the service) comprise a user ID, passcode and identification of a predetermined site key, partial credentials may be limited to user ID or the passcode or a less complex passcode, e.g., a four digit Personal Identification Number (PIN) or the like. The full authentication level may be based on the user currently being physically located 124 outside of the boundaries of predetermined physical area 126 by a predetermined distance. The predetermined distance is typically configured such that it indicates a significant deviation from the boundaries of the predetermined physical location. The full authentication level is configured such that the user is required to provide their designated full set of authentication requirements/credentials (i.e., the authentication requirements required if no other information is known about the user at the time of the request to access the service).

In alternate embodiments of the apparatus, the authentication requirements module 118 is configured to determine a point or location 142 along an authentication continuum 140 based, at least in part, on current location 124 of the user in relation to the boundaries of the predetermined physical location1 126. The point or location 142 along the authentication continuum 140 defines the authentication requirements. In this regard, the authentication continuum may comprise a sliding scale such that one end of the continuum defines no authentication and the other end of the continuum defines full authentication. In such embodiments of the apparatus, other factors/attributes known about the user at the time of the request and/or attributes related to the service being accessed or the time of the service request may be used in the determination of the point or location along an authentication continuum 146. In such embodiments of the invention, the point/location along the authentication continuum 146 may be determined objectively (e.g., using distance and time thresholds) or subjectively, implementing heuristics or the like, to determine an optimal point along the authentication continuum based on the totality of information known about the user, the service or the environment at the time of the access request.

In further embodiments of the apparatus 110, the authentication module 118 is configured to determine authentication requirements 130 by determining that the current location of the user 124 is located within one of a plurality of zones of authentication. For example, a first zone of authentication 144 may be defined by the boundaries of the user's place of residence 146 and/or the user's place of business1 48. It should be noted that the first zone may further delineated to a specific location within the place of residence (e.g., specific apartment building, room or the like) or a specific location with the place of business (e.g., a specific building or office within a building). The first zone of authentication may define the authentication requirements as either no authentication required or partial authentication (less than full authentication requirements/credentials). In another example, a second zone of authentication 150 may be defined by the residence of an individual associated with the user 152 (e.g., a friend, relative or the like) and/or a place of business consistently frequented by the user 154 (e.g., a grocery store, restaurant or the like). The second zone of authentication may define the authentication requirements as less than full authentication requirements and more than the authentication requirements required in the first zone.

In further embodiments the apparatus includes a service access module 156 that is stored in the memory 114 and is executable by the processor 116. The service access module 156 is configured to determine a level of access 158 available to the user upon the user meeting the determined authentication requirements. The level of access defines functionality available to the user within the service and may be based on the proximity in distance 160 of the current physical location of the user to the predetermined physical location. In such embodiments the determination of the level of access granted to the user may be independent of the determination of authentication requirements. While in other embodiments of the invention, the determination of the level of access may be independent of the determination of the proximity in distance 160 of the current physical location of the user to the predetermined physical location (i.e., the determination of level of access may be based on other factors/attributes related to the user's current state, the current environment/time, and/or the network service being accessed. The level of access may define transactions (or transaction limits) that the user is authorized to conduct or information the user is authorized to access during the session.

Referring to FIG. 4, a block diagram is presented of an apparatus 110 configured to determine a user's authentication requirements/credentials for a specific mobile network access session based on the current location of the user in comparison to a known typical travel route of the user, in accordance with alternate embodiments of the present invention. The apparatus 210 may include any type and/or combination of one or more computing devices. The apparatus 210 is operable to receive and execute modules, routines and applications, such as authentication requirements module 218 and the like.

The apparatus 210 includes computing platform 212 that can receive and execute routines and applications. Computing platform 212 includes memory 214, which may comprise volatile and nonvolatile memory such as read-only and/or random-access memory (RAM and ROM), EPROM, EEPROM, flash cards, or any memory common to computer platforms. Further, memory 214 may include one or more flash memory cells, or may be any secondary or tertiary storage device, such as magnetic media, optical media, tape, or soft or hard disk.

Further, computing platform 212 also includes at least one processor 216, which may be an application-specific integrated circuit ("ASIC"), or other chipset, processor, logic circuit, or other data processing device. Processor 216 or other processor such as ASIC may execute an application programming interface ("API") layer (not shown in FIG. 4) that interfaces with any resident programs, such as authentication requirements module 118 or the like, stored in the memory 214 of apparatus 210. Processor 216 includes various processing subsystems (not shown in FIG. 4) embodied in hardware, firmware, software, and combinations thereof, that enable the functionality of apparatus 210 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

The memory 214 stores authentication requirements module 218 that is configured to determine a user's authentication requirements/credentials for a specific mobile network access session based on the current location of the user in comparison to a known typical travel route of the user. The authentication requirements module 218 is configured to receive a request 220 for a user to access a network-based service that requires user authentication 222. The user authentication may be required to gain access to the network-service (e.g., an Internet-based service accessible via an application (i.e., "app") executable on a user device, such as a mobile communication device) and/or to conduct a transaction on the network-service.

In response to receiving the request, the module 218 is configured to determine (1) the current physical (i.e., geographic) location 224 of the user and time 226 and (2) that the user of the apparatus is associated with a predetermined travel route 228 having location boundaries 230 and a time period 232. The user is known to the module 218 since the service request is coming from a mobile communication device that is identifiable by procedures discussed previously. As such the module 218 accesses a user profile, or a database of known travel routes, to determine that the user is associated with one or more predetermined travel route. The current physical location 224 of the user may be determined by a location-determining mechanism (e.g., Global Positioning System (GPS) device or the like) in the mobile communication device which sent the service access request or via wireless signals transmitted from the mobile communication device using triangulation methodology or the like.

Once the authentication requirements module 218 has determined that the user is associated with a predetermined travel route 228 and has determined the current physical location of the user 224 and the current time 226, the module 218 is further configured to determine the proximity in distance and time 234 of the current physical location of the user 224 and current time 226 to the predetermined travel route 228 (i.e., the location boundaries 230 and time period 232).

The authentication requirements module 218 is further configured to determine the authentication requirements 236 (i.e., the authentication credentials required by the user) for user to currently access the service based on the proximity in distance and time 234 of the current physical location of the user 224 and current time 226 to the predetermined travel route 228. In specific embodiments of the invention, the authentication requirements are defined by levels of authentication 238. In specific embodiments of the invention, the levels of authentication 238 may define three levels of authentication, (1) no authentication level 240; (2) partial/soft authentication level 242 and (3) full authentication 244.

The no authentication level 240 may be based on the user currently being physically located 124 within the predetermined location boundaries 230 of the travel route 228 and the current time 226 being within the time period 232 of the travel route 228. The no authentication level 240 is configured such that the user is not required to provide authentication credentials to access the service.

The partial authentication level 242 may be based on (1) the user currently being physically located 224 within the predetermined location boundaries 230 of the travel route 228 and the current time 226 being within the time period 232 of the travel route 228 or (2) the user currently being physically located 224 outside of the predetermined location boundaries 130 of the travel route 228 by a predetermined distance and/or the current time 226 being outside of the time period 232 by a predetermined allotted time. The predetermined distance and the predetermined allotted time are typically configured such that they are slight deviations from the location boundaries 230 and time period 232 of the travel route 228. The partial authentication level 240 is configured such that the user is required to provide to some but less than full authentication requirements/credentials to access the service. For example, if full authentication credentials (i.e., standard credentials normally required to access the service) comprise a user ID, passcode and identification of a predetermined site key, partial credentials may be limited to user ID or the passcode or a less complex passcode, e.g., a four digit Personal Identification Number (PIN) or the like.

The full authentication level 244 may be based on (1) the user currently being physically located 224 outside of the location boundaries 230 of travel route 228 by a predetermined distance and/or (2) the current time 226 being outside of the time period 232 of the travel route 228 by a predetermined time. The predetermined distance and the predetermined time are typically configured such that they are significant deviations from the location boundaries 230 and time period 232 of the travel route 228. The full authentication level 244 is configured such that the user is required to provide their designated full set of authentication requirements/credentials (i.e., the authentication requirements required if no other information is known about the user at the time of the request to access the service).

In alternate embodiments of the apparatus, the authentication requirements module 218 is configured to determine a point or location along an authentication continuum 246 based, at least in part, on current location 224 of the user and the current time 226 in relation to the location boundaries 230 and the time period 232 of the travel route 228. The point or location along the authentication continuum defines the authentication requirements. In this regard, the authentication continuum may comprise a sliding scale such that one end of the continuum defines no authentication and the other end of the continuum defines full authentication. In such embodiments of the apparatus, other factors/attributes known about the user at the time of the request and/or attributes related to the service being accessed or the time of the service request may be used in the determination of the point or location along an authentication continuum 246. In such embodiments of the invention, the point/location along the authentication continuum 246 may be determined objectively (e.g., using distance and time thresholds) or subjectively, implementing heuristics or the like, to determine an optimal point along the authentication continuum based on the totality of information known about the user, the service or the environment at the time of the access request.

In further embodiments the apparatus includes a service access module 248 that is stored in the memory 214 and is executable by the processor 216. The service access module 248 is configured to determine a level of access 250 available to the user upon the user providing the determined authentication requirements. The level of access defines functionality available to the user within the service 252 and may be based on the determined authentication requirements or may be determined independent of the determined authentication requirements. Functionality may be a transaction that the user is authorized to conduct or information the user is authorized to access during the session. The determination of the level of access 250 may take into account the proximity in distance and time of the user to the travel route, as well as other information known about the user or the user's current environment at the time of the access request.

Referring to FIG. 5, a block diagram is presented of an apparatus 310 configured to determining a user's authentication requirements/credentials for a specific service along an authentication continuum based on a current state of the user and/or service attributes, in accordance with embodiments of the present invention. The apparatus 310 may include any type and/or combination of one or more computing devices. In specific embodiments the apparatus may be a server in communication with a mobile communication device or a mobile communication device. The apparatus 310 is operable to receive and execute modules, routines and applications, such as authentication requirements module 318 and the like.

The apparatus 310 includes computing platform 312 that can receive and execute routines and applications. Computing platform 312 includes memory 314, which may comprise volatile and nonvolatile memory such as read-only and/or random-access memory (RAM and ROM), EPROM, EEPROM, flash cards, or any memory common to computer platforms. Further, memory 314 may include one or more flash memory cells, or may be any secondary or tertiary storage device, such as magnetic media, optical media, tape, or soft or hard disk.

Further, computing platform 312 also includes at least one processor 16, which may be an application-specific integrated circuit ("ASIC"), or other chipset, processor, logic circuit, or other data processing device. Processor 316 or other processor such as ASIC may execute an application programming interface ("API") layer (not shown in FIG. 5) that interfaces with any resident programs, such as authentication requirements module 318 or the like, stored in the memory 314 of apparatus 310. Processor 316 includes various processing subsystems (not shown in FIG. 5) embodied in hardware, firmware, software, and combinations thereof, that enable the functionality of apparatus 310 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

Memory 314 stores authentication requirements module 318 that is determining a user's authentication requirements/credentials for a specific service along an authentication continuum based on a current state of the user and/or service attributes, in accordance with embodiments of the present invention. The authentication requirements module 318 is configured to receive a request 320 from a mobile communication device for a user to perform a function, such as access a network-based service 334 that requires user authentication 322 or conduct a purchase transaction 336 using a debit/credit card or the like.

In response to receiving the request, the module 318 is configured to determine the at least one of current physical state/condition of the user 324 and/or attributes related to the function 326 requiring access. The user is known to the module 318 since the service request is coming from a mobile communication device that is identifiable by procedures discussed previously. The current physical state 324 of the user may be determined by mechanisms disposed in the wireless communication device, such as location-determining mechanisms (Global Positioning System (GPS) device or the like), accelerometers, other sensors or the like. The current state of the user 324 may include but is not limited to, the geographic location of the user 338 (in relation to the mobile communication device), the movement of the user in a specified direction 344, the movement of the user across a predetermined boundary line 342, the change in location direction of the user 340 or the like.

Attributes related to the function 326 may include the type of service being accessed or type of transaction being conducted 346, the time (e.g., time of day, week, month, year or the like) of the access request or transaction 350, the amount of the transaction 352 and the like.

Once the authentication requirements module 318 has determined at least one of the current physical state of the user 324 and/or attributes related to the function 326, the module 18 is further configured to determine a location 330 along an authentication continuum 328 based, at least in part, on at least one of (1) a current physical state/condition of the user 324, or (2) an attribute related to the function 326. The location along the authentication continuum defines the authentication requirements/credentials 332 required for the user to perform the function (i.e., access a service, conduct a transaction or the like). In specific embodiments of the invention, the authentication continuum is a sliding-scale continuum in which one end of the continuum is defined by no authentication required to perform the function, the opposite end of the continuum is defined by either full authentication required, heightened authentication required (i.e., additional authentication requirements beyond standard authentication requirements, e.g., additional personal information from the user or answers to out-of-wallet challenge questions) or no authentication allowed at this time and locations in between vary the degree/amount of authentication requirements required for the user to perform the function.

In specific embodiments of the invention, the location 330 along the authentication continuum3 28 is an objective determination based on the at least one of the current physical state/condition of the user 324 and/or inclusion or omission of attributes related to the function 326. In other specific embodiments of the invention, the location 30 along the authentication continuum 328 is determined subjectively 352, implementing heuristics or the like, based on a totality of the current physical state/condition of the user 324, the attributes related to the function 326 and any other conditions/attributes 354 or the like related to the user or the function which may affect the authentication requirements. Conditions/attributes 354 related to the user are those that have an effect on validating the identity of the user and conditions attributes 354 of the function are those that have an effect on the risk involved with the function or providing access to the function.

In further embodiments, the authentication module 318 may be configured to determine a level of authentication 356 from amongst a plurality of levels. Each level may be predetermined based on different authentication requirement criteria related to the state of the user or the attributes of the function. In specific embodiments of the invention, the levels of authentication 338 may define four levels of authentication, (1) no authentication level; (2) partial/soft authentication level, (3) full authentication level, and (4) heightened authentication level.

The no authentication level is configured such that the user is not required to provide authentication credentials to access the service. The partial authentication level is configured such that the user is required to provide to some, but less than full, authentication requirements/credentials to access the service. For example, if full authentication credentials (i.e., standard credentials normally required to access the service) comprise a username, and password, partial credentials may be limited to a less complex passcode, e.g., a four digit Personal Identification Number (PIN) or the like. The full authentication level is configured such that standard/normal authentication requirements/credentials are required for the user to perform the function. The heightened authentication level may require the user to input additional personal information or answers to out-of-wallet challenge questions.

In further embodiments the apparatus includes a function level module 358 that is stored in the memory 314 and is executable by the processor 316. The function level module 358 is configured to determine a level of functionality 360 available to the user upon the user meeting the determined authentication requirements. The level of functionality 360 defines functions available 362 to the user within the service may be independent of the determination of authentication requirements. The level of functionality 360 may define transactions (or transaction amount limits 364) that the user is authorized to conduct or information the user is authorized to access during the session.

FIG. 6 is a flow diagram depicting a method 400 for determining user authentication requirements/credentials for a specific mobile network access session based on the current location of the user being within a predefined area requiring altered (i.e., increased or decreased) authentication requirements, in accordance with embodiments of the present invention, in accordance with embodiments of the present invention. At Event 402, a request is received for a user to access a network-based service that requires user authentication. The user authentication may be required to gain access to the network-service (e.g., an Internet-based service accessible via an application (i.e., "app") executable on a user device, such as a mobile communication device) and/or to conduct a transaction on the network-service.

At Event 404, in response to receiving the request, a determination is made as to the current physical (i.e., geographic) location of the user. The current physical location of the user may be determined by a location-determining mechanism (e.g., Global Positioning System (GPS) device or the like) in the mobile communication device which sent the service access request or via wireless signals transmitted from the mobile communication device using triangulation methodology or the like.

At Event 406, once the determination is made of the current physical location of the user, a determination is made that the current location of the user is proximate to or within a predefined physical area having altered authentication requirements. Altered authentication requirements are one of increased authentication requirements/credentials or decreased authentication requirements/credentials in comparison to standard/normal authentication requirements credentials.

At Event 408, the altered authentication requirements/credentials are identified. The authentication requirements/credentials are identified by accessing a database that correlates the predetermined physical areas to the associated altered authentication requirements. Once identified, the altered authentication requirements are presented to the user, typically via display on the mobile communication device, and the user provides the required altered authentication requirements as a means of accessing the service.

Thus, systems, apparatus, methods, and computer program products described above provide for determining a user's authentication requirements/credentials for a specific network access session based on the current location of the user in comparison to predetermined boundaries of location that have altered authentication requirements (i.e., increased or decreased authentication requirements/credentials that differ from the standard authentication requirements). Both the entity providing the network service or the user may designate areas for altered authentication requirements/credentials. The predetermined area may also coincide with a predetermined time (e.g., time of year, month, day or the like) in which the altered authentication requirements apply. Moreover, the altered authentication requirements may be temporal, for example, the altered authentication requirements apply to a specific event occurring at a specified time at the designated location.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer program product comprising:
   a non-transitory computer-readable medium comprising:
   a first set of codes for causing a server to determine that unsecured wireless communication is prevalent in a predefined physical area;
   a second set of codes for causing the server, in response to determining that unsecured wireless communication is prevalent in the predefined physical area, to configure the predefined physical area for altered authentication requirements, the altered authentication requirements providing for increased authentication requirements in comparison to standard authentication requirements used to initially access a network service provided by the server, wherein the altered authentication requirements are further based on a designated time period, the server being operated by an entity;
   a third set of codes for causing the server, after determining that unsecured wireless communication is prevalent in the predefined physical area and configuring the predefined physical area for the altered authentication requirements, to receive, from a handheld mobile communication device in wireless network communication with the server, a request for a user operating the handheld mobile communication device to access the network service provided by the server, accessible via an executable application stored on the handheld mobile communication device, where the network service requires user authentication for access;

a fourth set of codes for causing the server to, in response to receiving the request, determine a current physical location of the user and a time associated with the request based on data received from the handheld mobile communication device;

a fifth set of codes for causing the server to determine that the current location of the user is within the predefined physical area and that the time associated with the request is during the designated time period associated with the predefined physical area;

a sixth set of codes for causing the server to identify the altered authentication requirements associated with the predefined physical area and the designated time period;

a seventh set of codes for causing the server to receive from the user authentication data; and an eighth set of codes for causing the server to provide the handheld mobile communication device with initial access to the network service in response to the user meeting the determined altered authentication requirements associated with the predefined physical area and the designated time period.

2. The computer program product of claim 1, wherein wherein the predefined physical area is defined by the entity operating the server.

3. The computer program product of claim 1, wherein wherein the predefined physical area is defined by the user.

4. The computer program product of claim 1, further comprising a ninth set of codes for causing the server to determine that the handheld mobile communication device has an altered level of access within the network service, wherein the altered level of access provides for one of (1) increased or (2) decreased access to functionality within the network service once the user has met the altered authentication requirements.

5. The computer program product of claim 4, wherein the altered level of access provides for increased access to functionality within the network service once the user has met the altered authentication requirements.

6. The computer program product of claim 4, wherein the altered level of access provides for decreased access to functionality within the network service once the user has met the altered authentication requirements.

7. A method for determining user authentication requirements, the method comprising:

determining, by a server, that unsecured wireless communication is prevalent in a predefined physical area;

in response to determining that unsecured wireless communication is prevalent in the predefined physical area, configuring, by the server, the predefined physical area for altered authentication requirements, the altered authentication requirements providing for increased authentication requirements in comparison to standard authentication requirements used to initially access a network service provided by the server, wherein the altered authentication requirements are further based on a designated time period, the server being operated by an entity;

after determining that unsecured wireless communication is prevalent in the predefined physical area and configuring the predefined physical area for the altered authentication requirements, receiving, by the server, from a handheld mobile communication device in wireless network communication with the server, a request for a user operating the handheld mobile communication device to access the network service provided by the server, accessible via an executable application stored on the handheld mobile communication device, where the network service requires user authentication for access;

in response to receiving the request, determining, by the server, a current physical location of the user and a time associated with the request based on data received from the handheld mobile communication device;

determining, by the server, that the current location of the user is within the predefined physical area and that the time associated with the request is during the designated time period associated with the predefined physical area;

identifying, by the server, the altered authentication requirements associated with the predefined physical area and the designated time period;

receiving, by the server, from the user authentication data; and providing, by the server, the handheld mobile communication device with initial access to the network service in response to the user meeting the determined altered authentication requirements associated with the predefined physical area and the designated time period.

8. The method of claim 7, wherein the predefined physical area is defined by the entity operating the server.

9. The method of claim 7, wherein the predefined physical area is defined by the user.

10. The method of claim 7, further comprising determining, by the server, that the handheld mobile communication device has an altered level of access within the network service, wherein the altered level of access provides for one of (1) increased or (2) decreased access to functionality within the network service once the user has met the altered authentication requirements.

11. The method of claim 10, wherein the altered level of access provides for increased access to functionality within the network service once the user has met the altered authentication requirements.

12. The method of claim 10, wherein the altered level of access provides for decreased access to functionality within the network service once the user has met the altered authentication requirements.

* * * * *